Sept. 22, 1970  G. E. LEWIS  3,529,835
KELLY PACKER AND LUBRICATOR
Original Filed Oct. 12, 1967  3 Sheets-Sheet 1
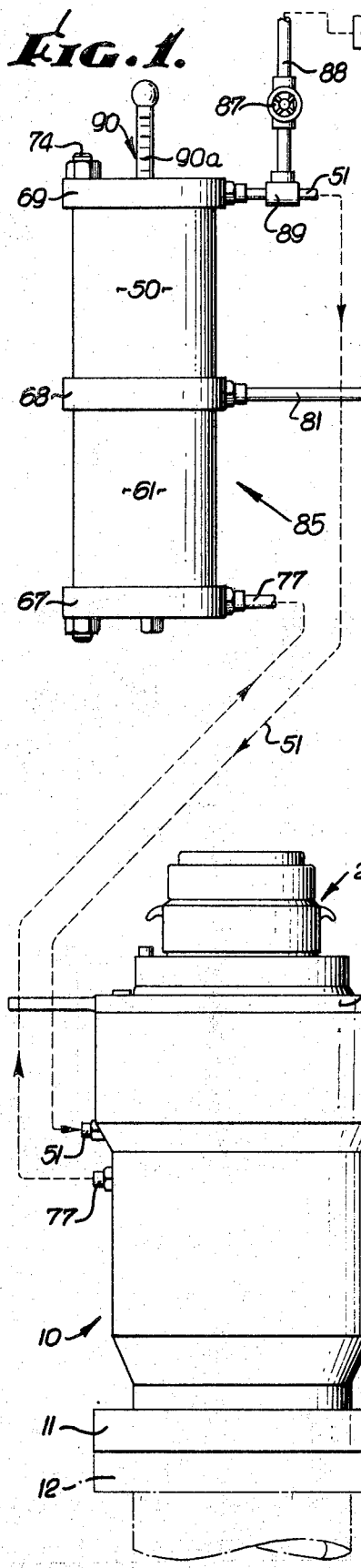
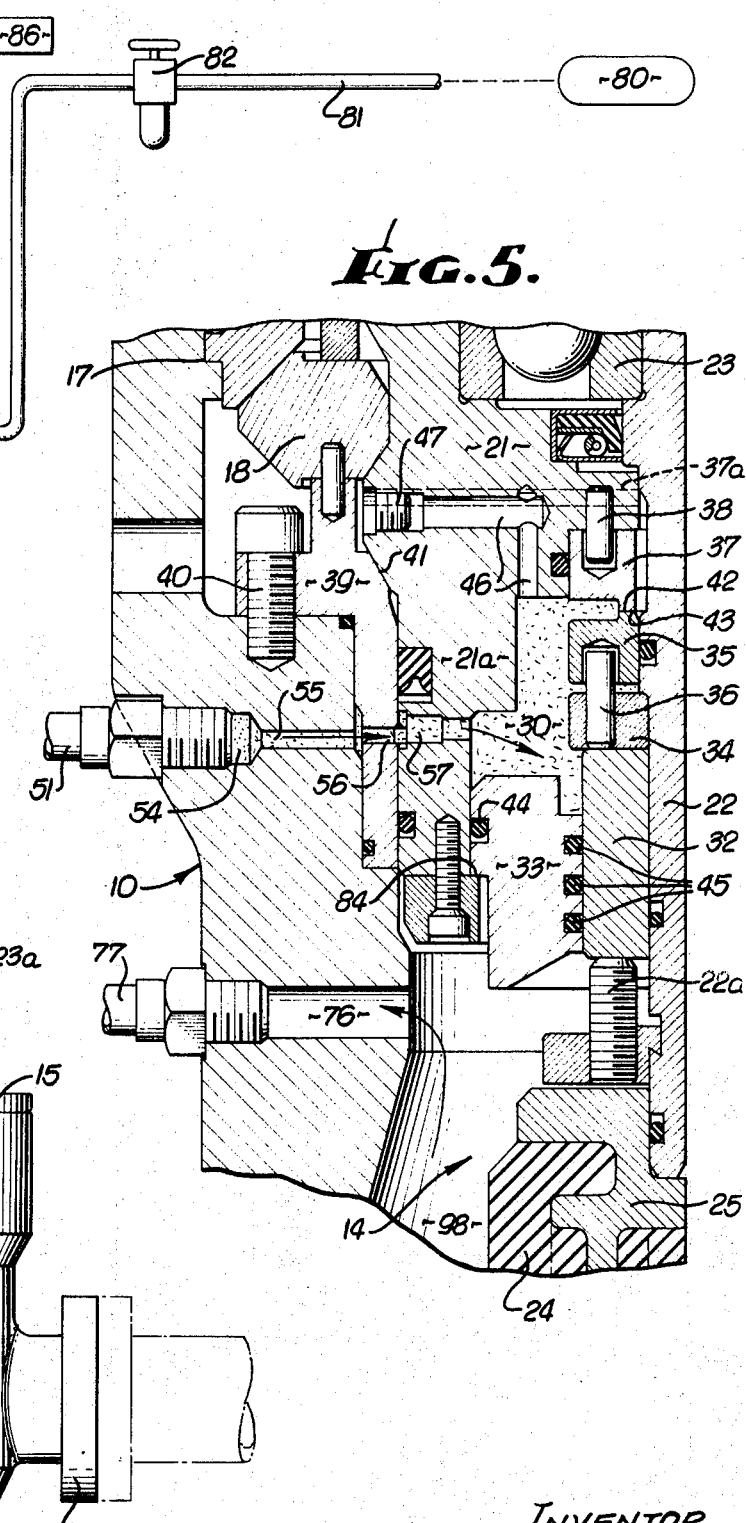
INVENTOR.
GEORGE E. LEWIS
By White & Haefliger
ATTORNEYS.

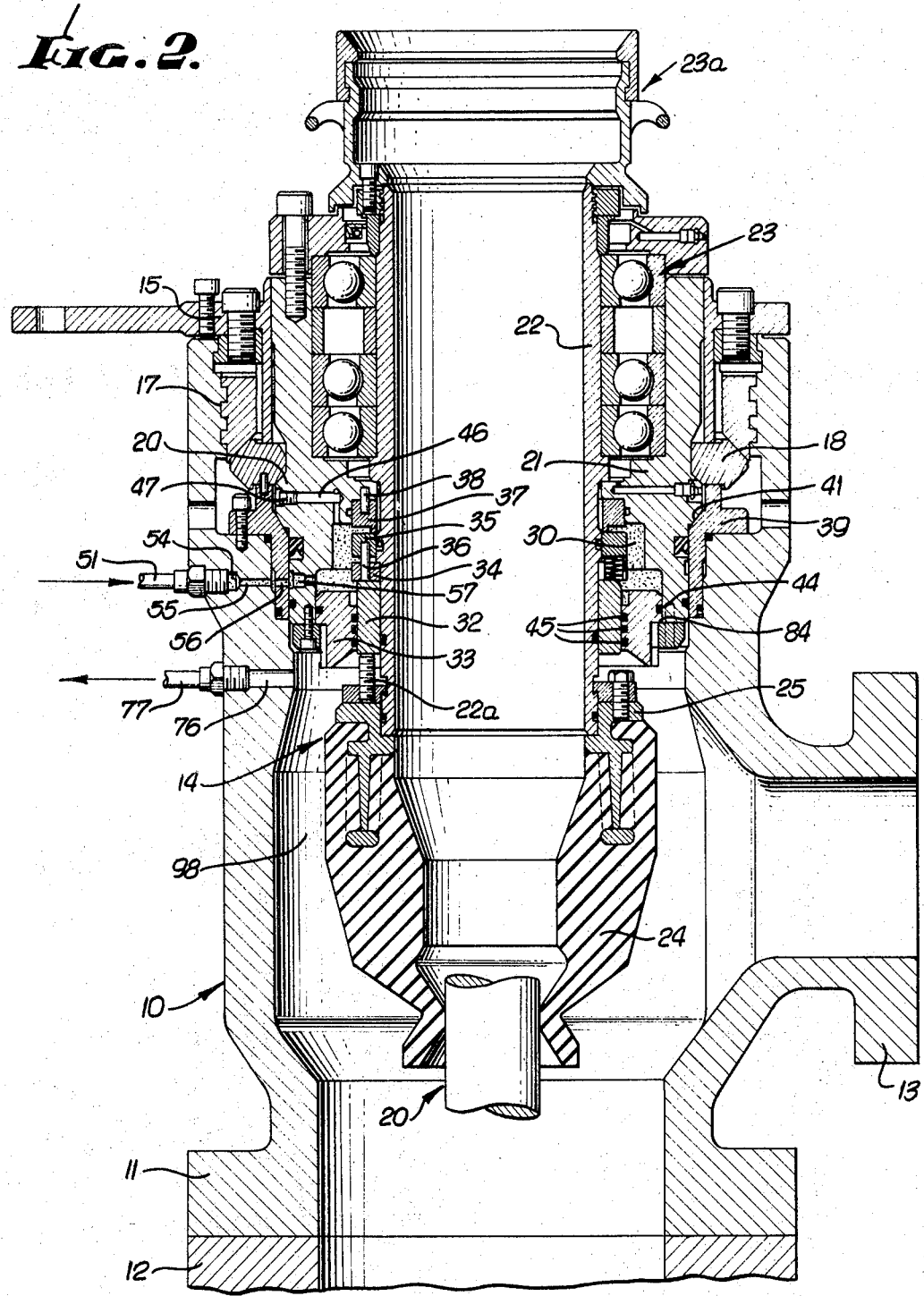

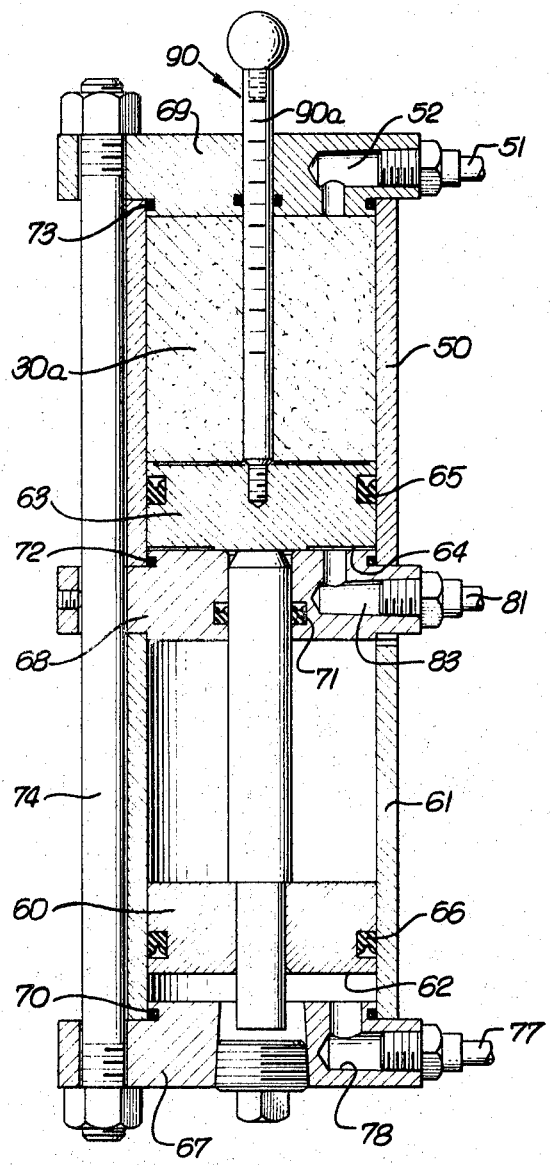
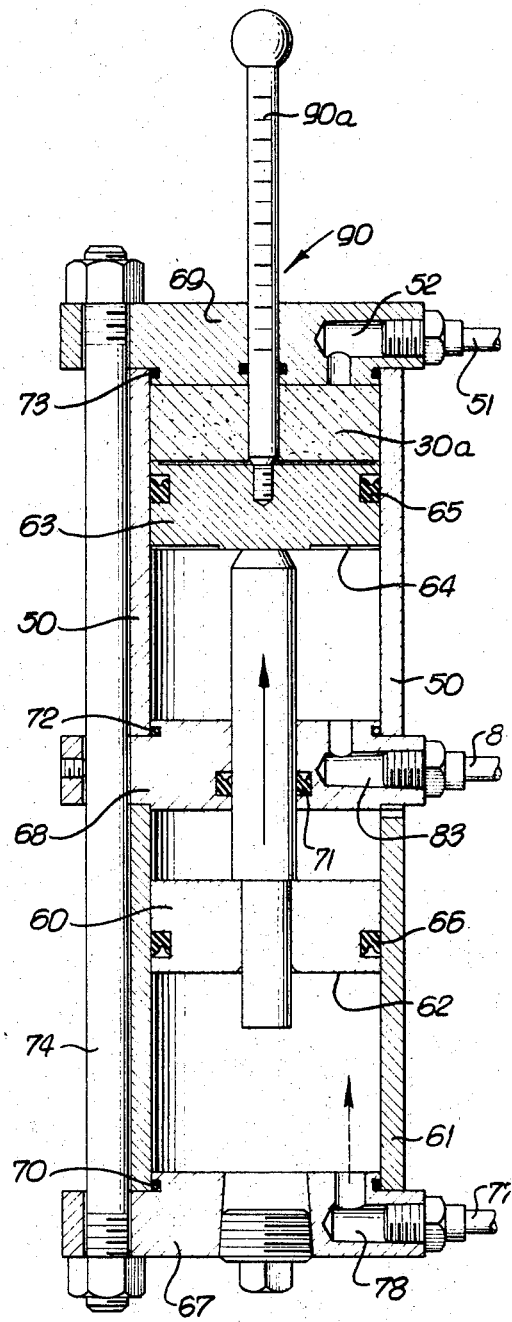

United States Patent Office 3,529,835
Patented Sept. 22, 1970

3,529,835
KELLY PACKER AND LUBRICATOR
George E. Lewis, Arcadia, Calif., assignor to Hydril Company, Los Angeles, Calif., a corporation of Ohio
Continuation of application Ser. No. 674,807, Oct. 12, 1967. This application May 15, 1969, Ser. No. 835,862
Int. Cl. F16j 15/32, 15/54
U.S. Cl. 277—2
8 Claims

ABSTRACT OF THE DISCLOSURE

Means is provided to effect displacement of sealing liquid from a supply cylinder into a leaking sealing chamber for maintaining the latter filled. The sealing chamber includes a first piston through which pressure from a main source is transmissible to the sealing liquid; and the referred to means includes piston structure having a primary piston surface to receive pressure application from the main source and a secondary piston surface to receive pressure application from an auxiliary source; one of the primary and secondary piston surfaces being movable in the supply cylinder.

---

This application is a continuation of application Ser. No. 674,807, filed Oct. 12, 1967, and now abandoned.

BACKGROUND OF THE INVENTION

This invention relates generally to seal pressurization and more particularly concerns automatic control of pressurization and replenishment of barrier liquid acting as a seal between relatively movable parts.

In certain sealing applications it is found that confined and pressurized sealing liquid tends to slowly escape from confinement, requiring its replenishment. An example of this is found in the well pressure seal structure described in U.S. Pat. 2,904,357 to G. S. Knox. As there described, barrier or sealing liquid is necessarily maintained in pressurized condition for lubricating relatively movable-bearing surfaces which seal off against abrasive well fluid, the barrier fluid slowly leaking from a sealing chamber via the bearing surfaces.

In those instances where the sealing chamber is located within complex assembled structure, as for exmaple in the rotating kelly packer assembly described in the above Knox patent, replenishment of the barrier liquid in the sealing chamber presents a number of problems. These include the time and expense of disassembly of the structure to gain access to the sealing chamber, and the expense involved in so-called down time of such structure.

SUMMARY OF THE INVENTION

It is a major object of the present invention to provide a solution to the above problems through the provision of unusually advantageous means for replenishing sealing liquid into the sealing chamber. In this regard, the invention takes into consideration the inclusion of a piston in the supply chamber and through which pressure from a main source, as for example well fluid, is transmissible to the sealing liquid.

Basically, the invention is directed to the combination that comprises sealing liquid supply means including an external supply container or cylinder having communication with the sealing chamber; and other means to pressurize liquid in the supply cylinder to an extent tending to effect displacement of sealing liquid from the supply means into the sealing chamber for maintaining the sealing chamber filled, that other means including piston structure having a primary piston surface to receive pressure application from the main source and a secondary piston surface to receive pressure application from an auxiliary source, the piston structure being movable in the supply cylinder. As a result, the auxiliary pressure is added to the main source pressure applied to the sealing liquid in the supply chamber so that the sealing liquid tends to be filled into the sealing chamber irrespective to whether or not the main source pressure fluctuates.

Typically, the mentioned other means also includes another cylinder, one of the primary and secondary surfaces being contained in one of the cylinders and the other of the primary and secondary piston surfaces being contained in the other cylinder; and the piston structure typically includes primary and secondary pistons respectively defining the primary and secondary piston surfaces. Further, the piston structure may advantageously include a coupling rod interconnecting the pistons, and an indicator may then be carried by the piston structure to visibly indicate the loss of sealing liquid from the larger, external supply chamber. The latter need not be disconnected from the sealing chamber for replenishment, the latter being accomplished without disturbing the functioning of the apparatus containing the sealing chamber.

These and other objects and advantages of the invention, as well as the details of illustrative embodiments, will be more fully understood from the following detailed description of the drawings, in which:

BRIEF DESCRIPTION OF THE DRAWINGS

FIG. 1 is an overall external elevation showing the sealing liquid supply apparatus of the invention combined with a rotating kelly packer unit;

FIG. 2 is a vertical section taken through the kelly packer unit;

FIGS. 3 and 4 are vertical sections taken through the sealing liquid supply apparatus in filled and partially filled condition; and FIG. 5 is an enlarged fragmentary vertical elevation taken through the kelly packer unit.

DESCRIPTION OF THE PREFERRED EMBODIMENT

Referring first to FIGS. 1 and 2, the illustrated apparatus environment of the invention comprises a rotating kelly packer unit which may be used with a blowout preventer in air drilling operations and for controlled pressure drilling, or reverse circulation drilling, while accommodating drill string rotation. The outer housing assembly 10 is flanged at 11 for mounting to the blowout preventer head 12, and is provided with a side outlet 13 flanged at 13. The housing 10 receives the inner assembly 14 which is lowered into the housing and locked in position by turning of control ring 15 about central axis 16. The ring has threaded connection with the housing at 17 and operates to hold a circularly spaced series of jaws 18 in engagement with the upper side of a flange 20 on the annular body 21 of the assembly 14.

The body 21 supports a rotary central sleeve 22, which is ball bearing mounted at 23, and is provided at its upper end with a driver, not shown, which engages a drive busing, on the kelly. The driver fits within rotary structure 23a mounted on the sleeve. A packer 24 is carried by and depends from the lower end of the sleeve, which projects below the body 21. Connector structure 25 connects that packer to the sleeve. Stripper packer 24 is adapted to seal around the kelly and any portion of the drill string, as for example is shown at 26.

A chamber to contain barrier or sealing liquid such as grease 30 seen in FIG. 5 is formed by non-rotary body extent 21a, rotary annulus 32 on sleeve 22 and positioned endwise by set screw 22a, annular piston 33 fitting between annulus 32 and body extent 21a, rotary rings 34 and 35 on sleeve 22 and interconnected by pin 36, and non-rotary ring 37 pinned to the body 21 by pin 38. To complete the assembly, the annular element 39 bolted to housing at 40 serves to seat the body 21 at 41 and to center it in the housing.

The pressure of well fluid, which is typically abrasive due to sand content, is exerted upwardly against the piston 33, which serves to pressurize the barrier liquid 30. Seals 44 and 45 seal off between the piston and elements 21a and 32. The liquid 30 slowly escapes between the interengaged rotating annular surface 42 and non-rotating surface 43 during a drilling operation accompanied by rotation of the sleeve 22 and packer 24. Such escape maintains the surfaces 42 and 43 lubricated and free of contact with the well fluid, which may be pressurized as high as 2,000 p.s.i. After escape between surfaces 42 and 43, the barrier or sealing liquid leaks upwardly through clearance between sleeve 22 and rings 37 to bleed hole 37a. Barrier liquid 30 initially filled into the chamber described via porting 46 plugged at 47.

Coming now to subject matter of more direct relation to the invention, the letter contemplates the provision of sealing liquid supply means including a supply cylinder having communication with the sealing chamber described above and containing barrier or sealing liquid 30. One such cylinder is represented at 50 in FIGS. 1, 3 and 4, there being a duct 51 communicating a port 52 in cap 69 at one end of that cylinder with ports 54–57 respectively in elements 10, 39 and 21a previously described.

The invention also contemplates the provision of other means to pressurize the liquid 30a in the supply cylinder to an extent tending to effect displacement of supply liquid into the sealing chamber to make up for leakage therefrom, and to maintain the sealing chamber filled. Such other means typically includes piston structure having a primary piston surface to receive pressure application from the main source of pressure and a secondary piston surface to receive pressure application from an auxiliary source; further, one of the primary and secondary piston surfaces is characteristically movable in the supply cylinder.

In the form of the invention shown, the piston structure typically includes a primary piston 60 in another cylinder 61 and having a primary piston surface therein at 62, as well as a secondary piston 63 in cylinder 50 and having a secondary surface 64 therein. Seals 65 and 66 pack off between the pistons and cylinder bores, and a central coupling rod transmits force for holding the pistons 60 and 63 in predetermined spaced relation. Note also cylinder end caps 67–69 held in position by elongated connectors 74, and the seals 70–73.

The primary piston surface 62 receives fluid pressure application from the main source, as for example well pressure, via port 76 in housing 10, line 77 and port 78 in end cap 67, whereby the supply liquid 30a is pressurized in proportion to pressurization of the sealing liquid 30 by piston 33. In addition, the secondary piston surface 64 receives fluid pressure application from the auxiliary source, as for example air bottle 80, via line 81 valved at 82, and port 83 in end cap 68, whereby the supply liquid 30a receives additional and overriding pressure tending at all times to effect displacement of sealing liquid into the sealing chamber to maintain the latter filled with sealing liquid 30. Accordingly, piston 33 is urged downwardly to shoulder at 84 in FIG. 5, under normal conditions.

From time to time the lubricator unit 85, which is accessible and exposed at the well head, may be refilled with supply liquid as from a source indicated at 86 in FIG. 1. This is accomplished without requiring disconnection of the lubricator from the housing 10, as by opening of valve 87 in line 88 to admit the higher pressure lubricant or supply liquid from source 86 to line 51 to which line 88 connects at 89.

Finally, an indicator 90 is carried by the piston structure to be bodily movable relative to the cylinders 50 and 61, for visibly indicating the loss of sealing liquid from the supply chamber. For example, when the indicator rod 90a projects as seen in FIG. 4, it is known that supply lubricant has been only partly exhausted from the upper cylinder 50. In the event replenishment is delayed, the supply of sealing liquid 30 is sufficient in the sealing chamber to last for considerable time during slow leakage at surfaces 42 and 43, piston 33 then being urged upwardly by the well pressure at 98 to maintain liquid 30 pressurized.

I claim:
1. In combination with a sealing chamber containing sealing liquid and from which said liquid is adapted to slowly leak, said chamber including a first piston through which pressure from a main source is transmissible to said sealing liquid,
   (a) sealing liquid supply means including a supply cylinder having communication with said sealing chamber,
   (b) another cylinder,
   (c) piston structure operable to pressurize liquid in the supply cylinder to an extent tending to effect displacement of sealing liquid into the sealing chamber for maintaining said sealing chamber filled, said piston structure including a primary piston defining a primary surface to receive pressure application from the main source and a secondary piston defining a secondary surface to receive pressure application from an auxiliary source, one of the primary and secondary pistons being in the supply cylinder and the other of the primary and secondary pistons being in the other cylinder, and
   (d) a member holding said primary and secondary pistons in predetermined spaced relation while transmitting force therebetween.

2. The combination of claim 1 including said auxiliary source of pressure.

3. The combination of claim 2 wherein said auxiliary source of pressure includes an air pressure bottle.

4. The combination of claim 1 wherein the interiors of said cylinders are separated by a barrier through which said member projects in coaxial relation relative to both cylinders.

5. The combination of claim 4 wherein said member is carried by only one of the primary and secondary pistons.

6. The combination of claim 4 wherein the piston on said supply cylinder is free from positive connection to said member.

7. The combination of claim 1 wherein said piston structure is movable relative to said cylinders, and including an indicator carried by said piston structure to move therewith and visibly to indicate the loss of sealing liquid from the supply cylinder.

8. The combination of claim 1 wherein said sealing chamber is defined by rotary and non-rotary coaxial tubular elements of a kelly-packer assembly, said assembly including an outer housing, said supply cylinder being located outside said housing.

References Cited
UNITED STATES PATENTS

| 2,567,479 | 9/1951 | Hebard | 277—3 |
| 2,764,999 | 10/1956 | Stanbury | 138—31 |
| 2,904,357 | 9/1959 | Knox | 277—31 |
| 3,176,996 | 4/1965 | Barnett | 277—2 |

SAMUEL ROTHBERG, Primary Examiner

U.S. Cl. X.R.
138—31; 277—3, 18, 27, 31, 32